United States Patent
Yoshioka et al.

(10) Patent No.: US 10,921,465 B2
(45) Date of Patent: Feb. 16, 2021

(54) RADON MONITOR

(71) Applicant: Airthings AS, Oslo (NO)

(72) Inventors: Koki Yoshioka, Oslo (NO); Bjørn Magne Sundal, Oslo (NO)

(73) Assignee: Airthings AS, Oslo (NO)

( * ) Notice: Subject to any disclaimer, the term of this patent is extended or adjusted under 35 U.S.C. 154(b) by 477 days.

(21) Appl. No.: 15/325,410

(22) PCT Filed: Jul. 10, 2015

(86) PCT No.: PCT/GB2015/051998
§ 371 (c)(1),
(2) Date: Jan. 10, 2017

(87) PCT Pub. No.: WO2016/005761
PCT Pub. Date: Jan. 14, 2016

(65) Prior Publication Data
US 2017/0160402 A1    Jun. 8, 2017

(30) Foreign Application Priority Data
Jul. 11, 2014    (GB) .................................... 1412352

(51) Int. Cl.
*G01N 31/00* (2006.01)
*G01T 1/169* (2006.01)
*G01T 1/17* (2006.01)

(52) U.S. Cl.
CPC ............. *G01T 1/169* (2013.01); *G01T 1/17* (2013.01)

(58) Field of Classification Search
CPC .. G01T 1/169; G01T 1/17; G01T 1/16; G01T 1/178; G01T 7/00; G01T 7/04; G01P 15/00

(Continued)

(56) References Cited

U.S. PATENT DOCUMENTS 3,968,371 A * 7/1976 Greendale ................. G01T 7/02
                                                          250/380
5,834,628 A    11/1998 Hunter et al.
(Continued)

FOREIGN PATENT DOCUMENTS

CN      101393144 A      3/2009
CN      202578785 U      12/2012
(Continued)

OTHER PUBLICATIONS

Combined Search and Examination Report from the United Kingdom Intellectual Property Office for GB1412352.5, dated Jan. 15, 2016, 8 pages.

(Continued)

*Primary Examiner* — Michael P Nghiem
(74) *Attorney, Agent, or Firm* — Klarquist Sparkman, LLP

(57) ABSTRACT

A method of measuring a radon concentration or a radon exposure level comprising: placing a plurality of individual radon measurement instruments at locations, each instrument being capable of data output; receiving radon measurement data from each of said plurality of instruments; combining said data from said plurality of instruments into a single data set; and calculating a radon concentration or radon exposure value from said single data set. Using a plurality of individual detectors and combining their data provides a much better overall analysis of radon concentration or radon exposure level. The calculated value may include producing an average of the radon concentrations across the multiple instruments. The average may be weighted with weights determined according to different locations such as proximity to ventilation devices or based on the time that an average user spends in each location.

20 Claims, 6 Drawing Sheets

(58) Field of Classification Search
USPC .......................................................... 702/24
See application file for complete search history.

(56) References Cited

U.S. PATENT DOCUMENTS

| | | | |
|---|---|---|---|
| 8,502,158 B1 | 8/2013 | Gordeev et al. | |
| 9,927,535 B2* | 3/2018 | Rodell | .................... G01T 1/178 |
| 2013/0320212 A1 | 12/2013 | Valentino et al. | |
| 2013/0331021 A1* | 12/2013 | Rodell | .................... G01T 1/178 |
| | | | 454/239 |

FOREIGN PATENT DOCUMENTS

| | | |
|---|---|---|
| CN | 202975339 U | 6/2013 |
| CN | 103591922 A | 2/2014 |
| JP | 2013140023 A | 7/2013 |
| KR | 1020040024141 A | 3/2004 |
| KR | 1020050029149 A | 8/2006 |
| WO | WO2013/184741 A1 | 12/2013 |

OTHER PUBLICATIONS

International Search Report and Written Opinion for PCT/GB2015/051998, dated Jan. 11, 2016, 18 pages.
Dulaiova et al., "A multi-detector continuous monitor for assessment of 222Rn in the coastal ocean," *Journal of Radioanalytical and Nuclear Chemistry*, Kluwer Academic Publishers, vol. 263, No. 2, Jan. 1, 2005, pp. 361-363.
Yamamoto et al., "Development of a real-time radon monitoring system for simultaneous measurements in multiple sites," *IEEE Transactions on Nuclear Science*, vol. 46, No. 6, Dec. 1, 1999.

\* cited by examiner

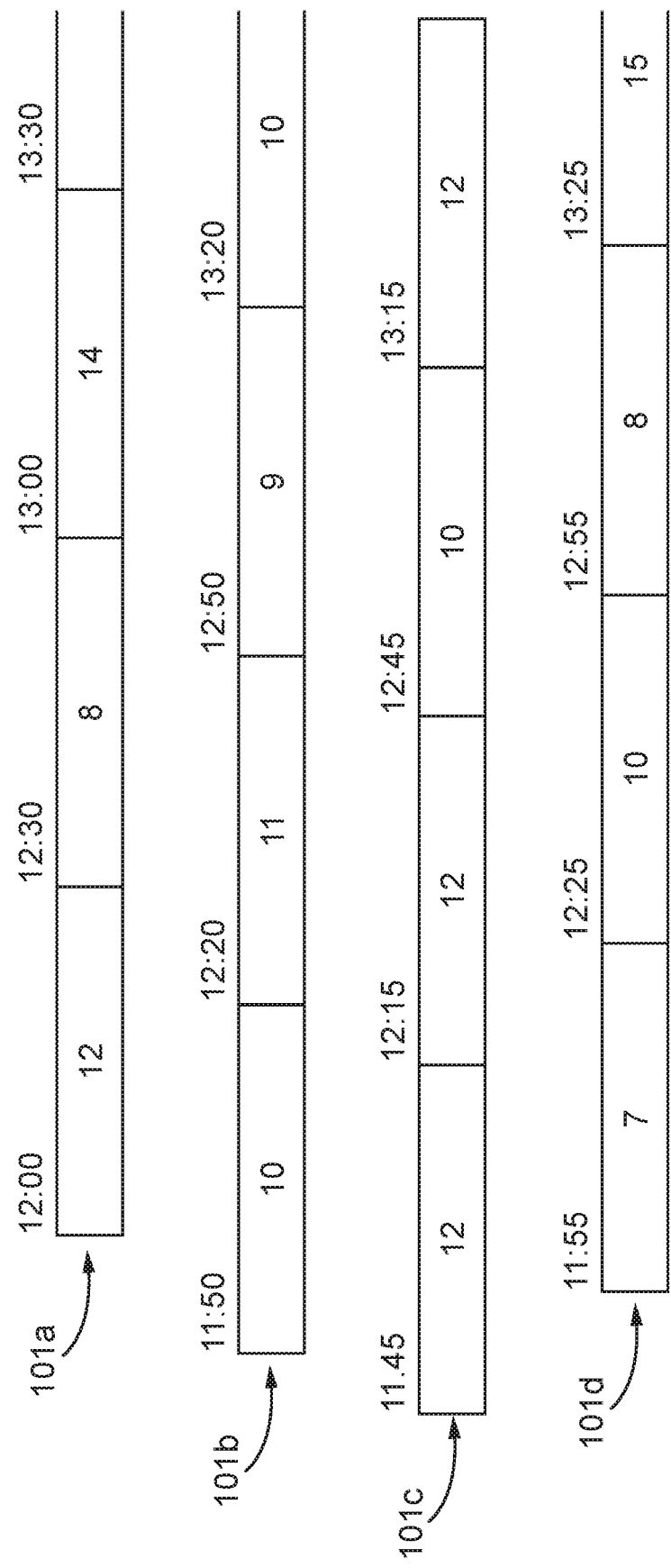

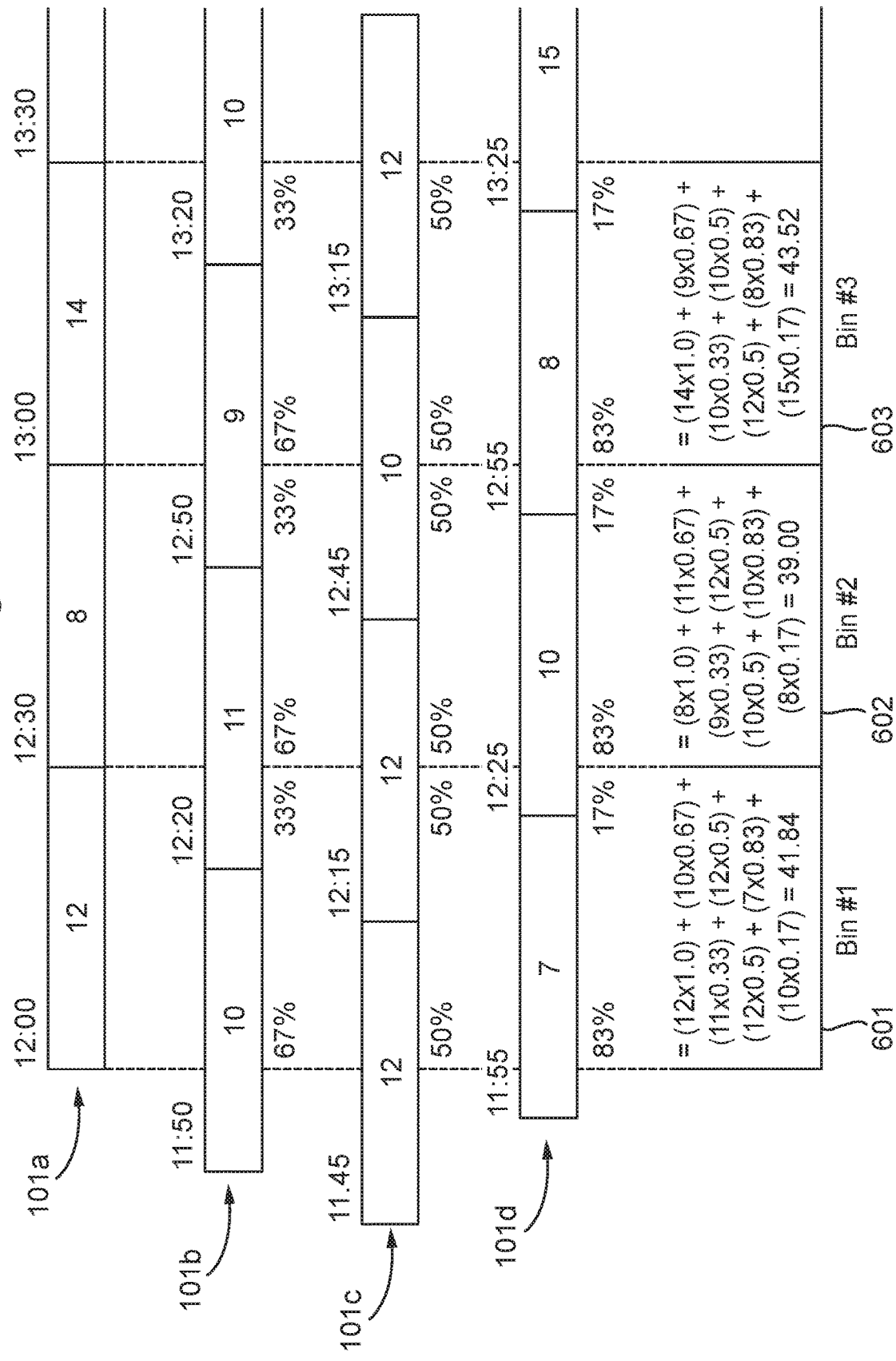

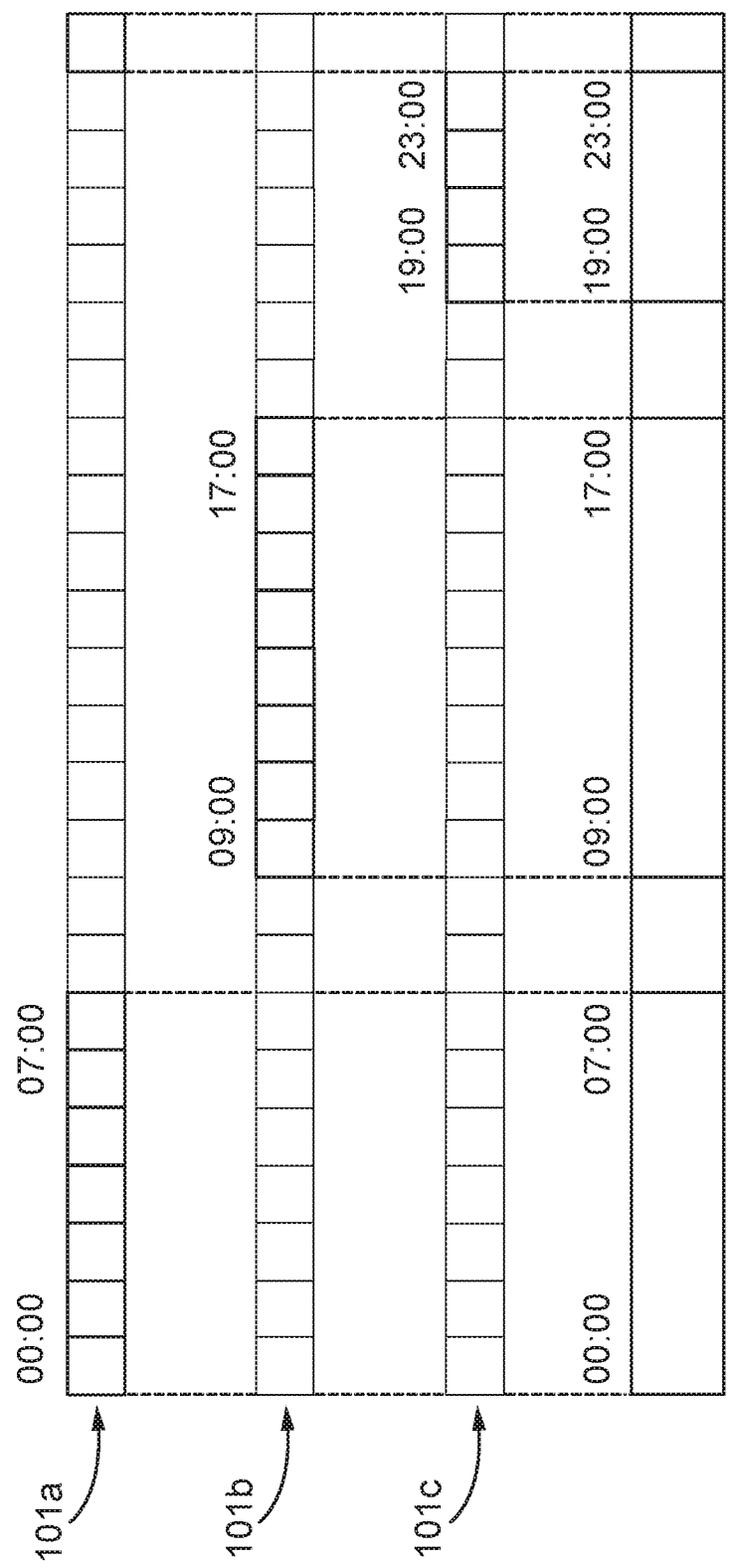

RADON MONITOR

CROSS REFERENCE TO RELATED APPLICATIONS

This is the U.S. National Stage of International Application No. PCT/GB2015/051998, filed Jul. 10, 2015, which was published in English under PCT Article 21(2), which in turn claims the benefit of Great Britain Application No. 1412352.5, filed Jul. 11, 2014.

FIELD OF THE INVENTION

The invention relates to radon monitors and methods and software for radon measurement, in particular to radon monitors and methods with decreased measurement uncertainty.

BACKGROUND AND BRIEF SUMMARY OF THE INVENTION

Radon is a radioactive element which at normal temperature and pressure is a gas. It is colourless, odourless and tasteless which means that its presence and concentration is not readily detectable by human beings. However, due to its radioactivity, it can be harmful if the concentration is too high. At normal concentrations, radiation from radon typically accounts for around half of a person's annual natural radiation dose.

The most stable isotope of radon is radon-222 which has a half life of 3.8 days and is produced as part of the decay chain of uranium-238 which is present throughout the Earth's crust. Being a noble gas, radon readily diffuses out of the ground and into the air around us. The daughter products of radon decay tend to be charged particles which will readily stick to dust or smoke particles in the air. When these particles are inhaled, they can lodge in the lungs and the subsequent radiation from decay of the radon daughter products causes a risk of lung cancer. Consequently, higher concentrations of radon lead to higher risks of cancer.

The concentration of radon in the atmosphere depends, amongst other things, on ventilation. Areas with good ventilation will have lower radon concentrations, whereas a lack of ventilation leads to radon accumulation and thus increases the radiation level in such areas. Radon levels outside therefore tend to be lower than inside buildings. For example, typical radiation doses from radon may be around 10-20 Bq/m$^3$ outside and may be around 100 Bq/m$^3$ inside. Radon levels can also vary significantly due to variations in geographic location (e.g. different geologies), or due to differences in building materials.

Radon decays by emission of an alpha particle with an energy of 5.5 MeV. The resultant Polonium-218 has a half life of about 3 minutes before emitting an alpha particle of 6.0 MeV. The resultant Lead-214 has a half life of around 27 minutes before beta-decaying to Bismuth-214 which in turn has a half life of 20 minutes and beta-decays to Polonium-214. Polonium-214 has a half life of about 164 microseconds before emitting an alpha particle of 7.7 MeV resulting in Lead-210 which has a half life of 22 years and is thus relatively stable.

Detection of radon to date has been divided into two main methods. The first method is active detection of alpha particles using an electronic instrument (where the sensor part consist of a photodiode or another electronic detection of the alpha particle and/or its daughters, such as ion chambers or scintillation cells read out by photomultipliers) and the second method is passive detection of alpha particles, the most typical method using a track detector (alpha particles create damages in a plastic film and subsequent etching with a caustic solution produces tracks that can be counted with a microscope). Typically the first method requires a large instrument and needs electrical power to be supplied. Such instruments have typically only been used for larger scale, e.g. commercial or industrial measurements as the instruments are more bulky and expensive. When the alpha particle sensor is a photodiode, in the simplest configuration the photodiode is placed in a diffusion chamber of the device. Alpha particles hitting the photodiode create a number of electron-hole pairs which will cause a small current to be generated. These current signals can be detected and counted to provide a measure of the radon concentration within the diffusion chamber. Such active measurements can be provided continuously in time rather than having to wait for the results of a laboratory analysis.

The second method uses much smaller detectors with no power requirement and is thus much more suited to domestic customers. A passive (i.e. unpowered) track chamber is typically placed in a selected location and left for a predetermined period of time (typically from a few weeks and up to about 3 months) after which it is sent back to a lab for analysis. Alpha particles emitted within the chamber leave tracks on a film which is also disposed within the chamber. These tracks can be detected in the lab and counted thus providing a measure of the radon concentration in the air within the chamber.

A typical process for analyzing radon levels in a public building is to deploy passive detectors initially and if those detectors indicate radon levels above a certain threshold then more detailed measurements are made with an active detector that can monitor how the radon level varies throughout a day and/or from day to day (e.g. working days versus weekend days). Variations in radon level typically occur due to changes in ventilation, e.g. when active air circulation is turned off to save power at the end of a working day and/or for the weekend. The more detailed measurements are often quite time limited due to the expense and inconvenience of getting a professional radon monitoring company in with an accurate active radon monitor. Accurate radon instruments are expensive and are often bulky as well as drawing significant power (requiring either a large battery or a mains connection). However, often the absolute value of the active detector is not important so much as the changes in measurement throughout the measurement period in question. For example, the active detector can provide a ratio of radon measurements between two time periods (e.g. working time versus non-working time). That ratio can then be applied to the original data gathered from passive track detectors to provide an estimate of the (for example) working time and non-working time concentrations during the initial period.

The uncertainty in radon measurements is governed by counting (Poisson) statistics. This uncertainty is proportional to the square root of the number of counts. Normally the best way to increase the number of counts and thus decrease the measurement uncertainty is to wait until enough counts have been accumulated. However, this can take a significant quantity of time and it is desirable to reduce this period of time where possible.

As mentioned above, the more detailed measurements made by active detectors are typically performed by a specialist firm who will deploy a high quality radon monitor for a period of time (typically 3 days) sufficient to gather adequate data and then remove the monitor, perform data analysis and provide a radon report to the customer.

When analyzing the data from an active radon monitor the data are normally divided into time slots (e.g. 30 minute slots) throughout the period. Each time slot has a number of counts detected within that slot and therefore has an uncertainty associated with it. The time slots must be made sufficiently long that the measurement uncertainties are acceptable. Thus, reductions in measurement uncertainty can be translated into shorter time slots and thus finer measurement resolution.

According to a first aspect, the invention provides a method of measuring a radon concentration or a radon exposure level comprising: placing a plurality of individual radon measurement instruments at locations, each instrument being capable of data output; receiving radon measurement data from each of said plurality of instruments; combining said data from said plurality of instruments into a single data set; and calculating a radon concentration or radon exposure value from said single data set.

Using a plurality of individual detectors and combining their data provides a much better overall analysis of radon concentration or radon exposure level. Each measurement instrument outputs its own radon data independently of the other instruments and that data could be used on its own if desired. However, when combined with other instruments' data, a more accurate analysis can be made.

The calculated value may be any desired calculation based on the available data. Examples include producing an average of the radon concentrations across the multiple instruments. The average may be a weighted average with weights determined according to user input or according to internal logic and/or calculations. For example, if the individual instruments are placed in different locations, then different weights might be applied based on proximity to ventilation devices or based on the time that an average user spends in each location. These would be user determined weights. Alternatively or additionally, the system may calculate weights according to estimates of instrument reliability based on statistical analysis across the multiple instruments. The calculated value may also be a set of values such as time slots or time windows throughout a longer time period and may include averaging or other statistical or analytical functions of the data.

Radon concentration (calculated based on the number of detected disintegrations per second) for a particular location is often the most important parameter to be measured. However, it may also be desired to monitor the radon exposure level that an individual has during a certain time period across multiple locations, e.g. based on time spent at work and time spent at home. Multiple instruments can monitor multiple locations and the data can be combined with scheduling or time/location data to calculate an individual's typical exposure level.

In some preferred embodiments the method comprises placing the plurality of individual radon measurement instruments in the same area such that they all sample the same environment. Sampling the same environment means sampling the same air space in the sense that the radon concentration is unlikely to vary between devices. As all devices are therefore measuring the same radon concentration, their data can be combined so as to produce a combined and better data set.

For example, using multiple individual radon instruments to measure a single location (i.e. a single local environment such as a room within a building) leads to a greater number of counts being detected for that location and thus when the individual instrument data are all combined into a single data set, the uncertainty is reduced due to the increased number of counts.

The homogeneity of the radon concentration within an environment depends on the particular environment that is being monitored. However, in most cases the radon concentration does not vary greatly over a distance of about 1 metre. Therefore preferably the plurality of individual instruments are placed within 1 metre of each other. With no instrument more than 1 metre from any other instrument, it is reasonable to assume that all instruments produce an estimate of the same radon concentration. As radon is emitted from the ground, height can sometimes be an important factor. Therefore in some preferred embodiments all individual radon instruments are located at substantially the same height above ground.

The radon instruments may have different measurement sensitivities. In the case of a solid-state (photodiode) based instrument operating in diffusion mode the sensitivity is mainly given by the diffusion chamber size, the strength of the collecting electric field inside the diffusion chamber as well as the total alpha particle sensitive photodiode area). If the radon instruments have different sensitivities then this needs to be compensated when merging the data from several instruments into a single data set. However, in particularly preferred embodiments, the plurality of instruments all have the same radon sensitivity. When the instruments have the same sensitivity, the data can simply be merged in a straightforward fashion. One preferred way to ensure that the individual instruments all have the same sensitivity is to use the same type of instrument for each individual instrument. For example, the instruments should all have the same diffusion chamber size, diffusion length and detector sensitivity. Using the same make and model of instrument from a single manufacturer will normally ensure that the instruments have the same sensitivity, but this may also be achieved through instrument calibration.

In other embodiments, instead of placing all of the plurality of individual instruments in essentially the same location, the plurality of instruments may be placed in a plurality of environments and the data from said plurality of instruments may be combined by extracting different time segments from each instrument and inserting them into the single data set. This mode of operation allows a set of instruments to be placed in a set of locations where an individual (or a typical individual from a group) visits throughout a period of time (e.g. a day, a week, a month, etc.). Each individual instrument simply measures the radon concentration as normal. However, when the data from the plurality of instruments is combined into a common data set, different time periods may be taken from different individual instruments, or the data from different instruments may be combined with different weights for different time periods so as to reflect the different amounts of time that have been spent in different radon concentrations throughout the given time period.

For example, individual radon monitors could be placed around a workplace, for example one in an office and one in a lab and one in a canteen. Alternatively or in addition, monitors could be placed at a person's home, e.g. in the kitchen, living room and bedroom. The data from all of these monitors can be combined by merging them according to the time that the person in question has spent in each location (or the average amount of time typically spent). For example, if the individual's actual time distribution is not known or monitored, the data may be combined according to expected times, for example, while at work an individual may be expected to spend 4 hours in an office, 3 hours in a lab and 1 hour in the canteen on a typical day. Therefore the radon concentrations from the relevant individual monitors may be combined in that ratio. For more detailed analysis, if the person's working routine is known more precisely, for example, if it is known that the individual typically spends 3 hours in the lab in the morning, 1 hour in the canteen at lunchtime and 4 hours in the office in the afternoon, then the relevant time periods can be extracted from each individual radon monitor for the relevant location for a more accurate analysis. Going even further, if the person's movements are tracked throughout the day (e.g. using proximity detectors, door sensors or GPS (e.g. on the user's smartphone) or other location identification sensors, the time/location data can be combined with the relevant individual radon monitors for the most accurate combined data set that accurately represents a person's typical exposure. It will be appreciated that multiple individual radon instruments may be placed in each location of interest so as to provide decreased measurement uncertainty as described above.

As described above, the calculated value may be any desired statistic derived from the available data. However in some preferred embodiments the single data set is divided into time slots and the method comprises calculating for each time slot a radon concentration or radon exposure value and a measurement uncertainty value based on the number of disintegrations detected within that time slot. The time slots of the single data set each may contain data from more than one individual instrument. However, the data have been merged onto a common time scale so that the radon concentration can be seen as a function of time. Each time slot within the single data set may have a total number of counts (detected disintegrations) associated therewith, potentially including detected counts from the different instruments. In some embodiments, the data may have a number of energy windows with a count associated with each energy window. An energy window is a range of energies. When an alpha particle is detected, its energy can be determined from the strength of the photo detector signal. Energy windows may be defined for each of the alpha emitters in the Radon-222 decay chain. Thus the data may comprise a Radon-222 window, a Polonium-218 window and a Polonium-214 window each with a count associated therewith. The uncertainty is related to the number of counts and therefore a measurement uncertainty value can be calculated for each time slot.

Essentially, each time slot in the single data set (and thus in the common time scale) can be considered as a time domain 'bin' into which counts from the different individual instruments are placed. Each 'bin' may then have an associated uncertainty which is proportional to the square root of the total number of counts associated with that bin.

Any instruments can be used as the individual radon measurement instruments. However, many such instruments are large and consume a lot of power. It is preferred that each individual instrument is battery powered. This has particular advantages when several instruments are to be placed in the same location as it may not be practical to plug several instruments into wall sockets. Battery powered devices necessarily need to be smaller and with lower power electronics if the batteries are to last for a significant period. It is preferred that the instruments be of a handheld size. The instruments are not held in the hand during use, but are of a suitable size to be held comfortably within one hand. This allows several units to be placed in the same location without being too intrusive. This is particularly important as the instruments are often monitoring locations that are in constant use and therefore the instruments need to be located somewhere where they are not in the way or likely to need to be moved.

Moving instruments during a measurement period is generally considered disruptive to the data. In general, an instrument should be left in the same place throughout the measurement period so that it always samples the same air space and is thus representative of the radon concentration in that air space. It is therefore useful to know if an instrument has been moved or disturbed during the measurement period. Each individual instrument may comprise one or more accelerometers or motion sensors to detect movement of the instrument and if movement is detected, data from that instrument may be excluded from the single data set. By detecting movement of each instrument, a determination can be made of whether or not each instrument remained at rest throughout the measurement period or was moved or disturbed during the measurement period. If an instrument was disturbed and it is one of a group of instruments all monitoring the same location, the data from that instrument may be excluded from further analysis so that a reliable measurement value can still be produced from the remaining instruments of the group. Alternatively, the data can be included in the combined data set but flagged as potentially unreliable so that a decision on whether to use that data can be made at a later stage in the data analysis.

Each individual instrument may comprise a temperature and/or a humidity sensor and when combining data from the individual instruments into the single data set, the temperature and/or humidity data for each instrument may be compared with the other instruments and if one instrument produces data in significant disagreement with the other instruments, that instrument's data is not combined into the single data set. A problem with performing a radon measurement with a single instrument is that it can be difficult to detect any fault or mis-calibration in the instrument. With two instruments, a discrepancy between instruments can be detected, suggesting that one of the instruments may have experienced a problem. With three or more instruments, so long as two instruments match reasonably well, a third instrument that produces significantly different results can be ignored, thus excluding data that may be erroneous. The overall accuracy of the measurement is thus improved. It is therefore preferred that when several instruments are co-located, at least three instruments are provided in each location of interest. The discrepancy in data can be based on the radon data itself or it can be based on temperature and humidity sensors. Temperature and humidity should remain the substantially the same within a local area (e.g. when all instruments are co-located within 1 metre of each other as discussed above) and therefore these provide a good indicator of whether something has gone wrong with an instrument. Environmental conditions such as the temperature and humidity can also affect the radon concentration, so the expected variations can also be taken into account in this analysis.

Merging data from different individual instruments according to time can be done in any suitable way. Combining data from the plurality of instruments may comprise comparing a clock on each instrument to a reference clock and determining a clock offset for each instrument, and adjusting timestamp data in the data from each instrument using said offset so that all time data relates to a common time scale. The reference clock and common time scale may be independent from all instruments (e.g. taken from the computer that amalgamates the data. Alternatively, the reference clock and common time scale may be taken from one of the instruments.

Individual radon measurement instruments may report their measurement data via a data output in the form of a series of time slots (e.g. 30 minute time slots) with an associated value for the number of alpha particle detections within that time slot or the number of radon disintegrations within that time slot (or any other statistic indicative of the radon concentration). Each radon instrument will generally have its own internal clock and it will log its data with reference to its own clock. Therefore when these data sets are brought together, each will have its own time scale and these will need to be aligned in order to merge them. A first step to merging may be to convert all timestamps within the multiple individual data sets to a common time scale. The clocks in the individual instruments may remain unadjusted. Each clock will drift gradually until it is either reset manually (e.g. following a battery change) or via a synchronization procedure. In some embodiments it is preferred to adjust the clock of each individual instrument each time a data collection is performed. As part of the data transfer, a reference clock or clock adjustment value can be transmitted back to the individual instrument which thus synchronises its own internal clock with the reference clock. This keeps the individual instrument clocks from drifting too far apart and thereby keeps the time slots from the different instruments more aligned with each other over time.

Preferably each instrument's data is divided into time slots and combining the individual instrument data into said single data set comprises interpolating the time slots of each individual instrument data into common time slots of said single data set. Each time slot in an individual instrument's data may straddle two time slots of the common data set if the local clock and the common reference clock are not exactly aligned. To merge the data, the value for the number of counts or the number of disintegrations within the local time slot needs to be divided between the two time slots of the common time frame. As radon disintegrations are normally assumed to occur randomly in time, the split may in preferred embodiments be made in proportion to the amount of time overlap between the local time slot and the target common time slot.

According to another aspect, the invention provides a radon monitor comprising: a plurality of individual radon measurement instruments, each instrument being capable of data output; and a data processor arranged to receive data from each individual radon instrument, combine said data from said plurality of instruments into a single data set and calculate a radon concentration or radon exposure value from said single data set.

The preferred features described above in relation to the method apply equally to the apparatus. Thus the plurality of individual radon measurement instruments may be located in the same area such that they all sample the same environment. The plurality of individual radon measurement instruments may be located within 1 metre of each other. The plurality of instruments may all have the same radon sensitivity.

The plurality of instruments may be located in a plurality of environments and the data processor may be arranged to combine the data from said plurality of instruments by extracting different time segments from each instrument and inserting them into the single data set. The single data set may be divided into time slots and the data processor may be arranged to calculate for each time slot a radon concentration or radon exposure value and a measurement uncertainty value based on the number of disintegrations detected within that time slot. The data from each instrument may have a number of energy windows with a count associated with each energy window.

The individual instruments are preferably battery powered. Each individual instrument may comprise one or more accelerometers or motion sensors to detect movement of the instrument and the data processor may be arranged such that if movement is detected, data from that instrument is excluded from said single data set. Each individual instrument may comprise a temperature and/or a humidity sensor and said data processor may be arranged such that when combining data from said individual instruments into said single data set, the temperature and/or humidity data for each instrument is compared with the other instruments and if one instrument produces data in significant disagreement with the other instruments, that instrument's data is not combined into the single data set.

When combining data from the plurality of instruments said data processor may be arranged to compare a clock on each instrument to a reference clock and determine a clock offset for each instrument, and may further be arranged to adjust timestamp data in the data from each instrument using said offset so that all time data relates to a common time scale.

Each instrument may be arranged to produce data divided into time slots and when combining the individual instrument data into said single data set said data processor may be arranged to interpolate the time slots of each individual instrument data into common time slots of said single data set.

According to yet a further aspect, the invention provides a software product comprising instructions which when executed by a computer cause the computer to: receive radon measurement data from each of a plurality of radon measurement instruments; combine said data from said plurality of instruments into a single data set; and calculate a radon concentration or radon exposure value from said single data set.

The software product may be in the form of instructions stored on a data carrier. Alternatively, the software product may be in the form of instructions transmitted from a remote location.

The invention also extends to a kit comprising: a plurality of individual radon measurement instruments, each instrument being capable of data output; and software as described above. Preferably the kit further comprises a mount with a plurality of mount points for mounting a plurality of individual radon measurement instruments adjacent to each other.

The preferred features described above in relation to the method apply equally to the software and to the kit. In particular, all preferred features described in relation to the individual instruments may apply to the individual instruments of the kit.

Certain preferred embodiments of the invention will now be described, by way of example only, and with reference to the accompanying drawings in which:

BRIEF DESCRIPTION OF DRAWINGS

FIG. 4 illustrates combining different data sets on different time scales;

FIG. 6 illustrates combining multiple data sets for improved uncertainty; and

FIG. 7 illustrates combining multiple data sets from different locations.

DETAILED DESCRIPTION OF THE INVENTION

Figure 1A:
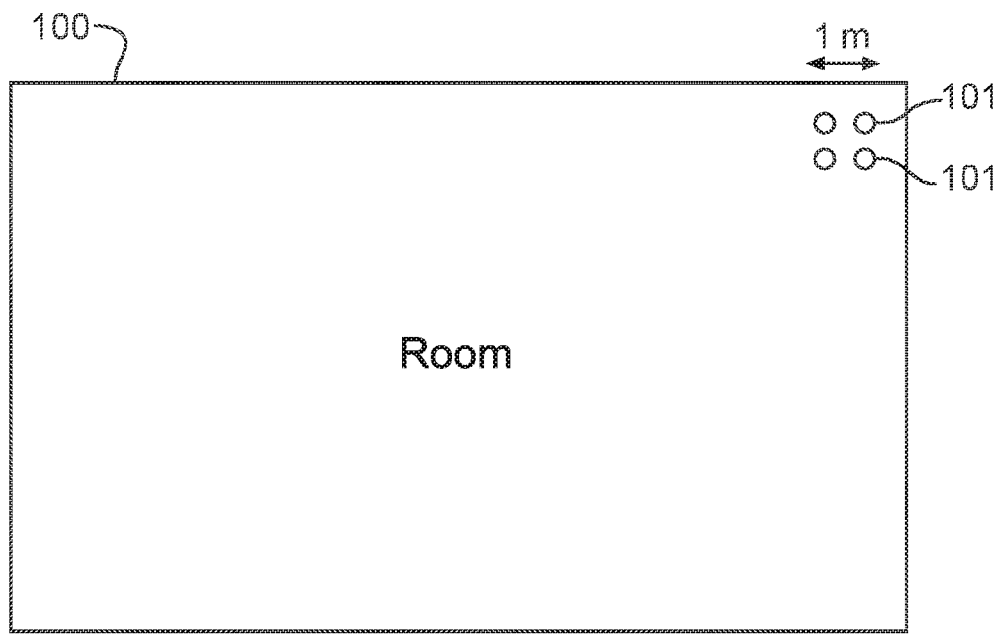
FIGS. 1a and 1b show some example placements of radon instruments within a building.

FIG. 1a shows a room 100 with a set of four individual radon monitors 101 located therein. Each individual radon monitor 101 operates as a standalone unit and can output data on its detected radon concentration either via a data cable (e.g. USB) or via wireless data transmission (e.g. 802.11 or Bluetooth). As shown in FIG. 1a, the four individual radon instruments 101 are arrangement approximately in a square, but this need not be the case. The instruments radon monitor 101 could equally well be placed in a line or in any other arrangement. The four units 101 are however arranged so that no instrument is more than 1 metre from any other instrument in the set so that they all sample the same air space and essentially the same environmental conditions.

Figure 1B:

FIG. 1b shows an alternative use of a set of individual radon instruments. In this case a set of five individual instruments 101 have been divided among three locations within a building. One instrument 101 has been placed in a kitchen 105, two instruments 101 have been placed in a living room 106 and two instruments 101 have been placed in a bedroom 108. Where two instruments 101 are located in the same room they are located within 1 metre of each other as described above to ensure that they sample the same airspace within the room. The amount of time that a user typically spends in each room can be used to combine the data sets from the different instruments 101 so as to produce an overall estimate of the radon exposure experienced by that individual throughout a typical day. Placing two instruments in a room provides for a better uncertainty as will be discussed in more detail below. However, it also provides more redundancy in the event that one of the instruments fails or produces readings that do not make sense. The other unit can still be used to provide useful data. Failure of a unit could be for a number of different reasons, but for example a unit may run out of battery. Alternatively, a unit may detect a physical disturbance through an internal accelerometer or tilt sensor. Such movement may be indicative of the fact that a unit has been moved or otherwise tampered with during the measurement period.

Figure 2A:
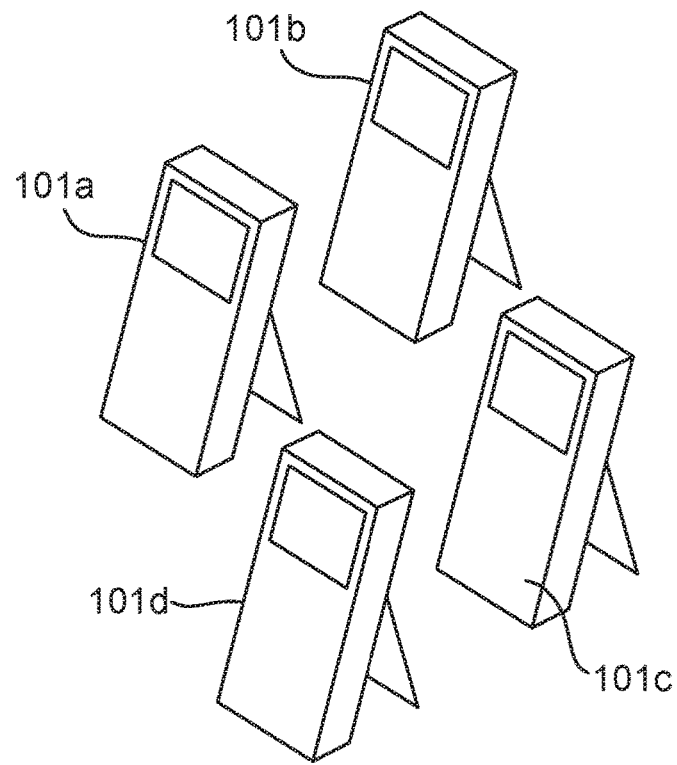
FIGS. 2a and 2b show examples of radon instrument placements.
Figure 2B:
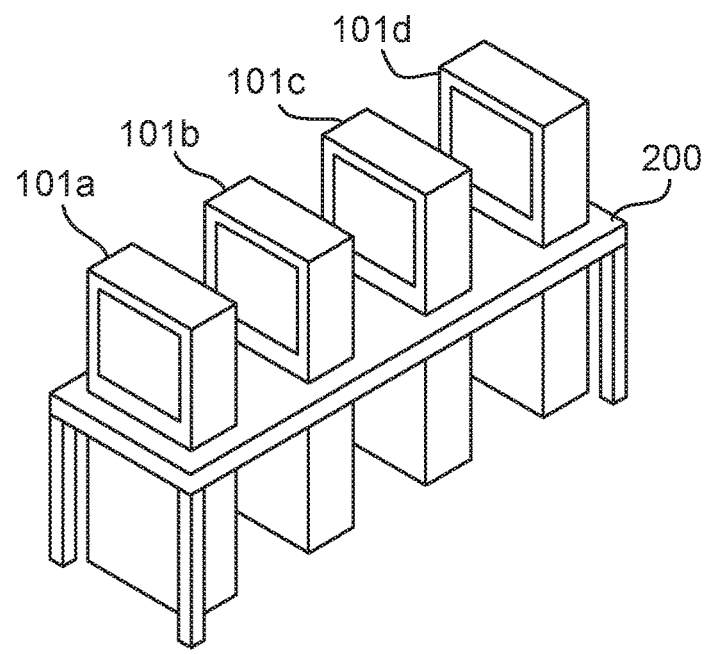

FIGS. 2a and 2b each show a set of four individual instruments 101a-d. In FIG. 2a, the instruments are simply placed together in a group. In FIG. 2b a mount or holder 200 is provided to support the four instruments 101a-d in close proximity to one another, but with sufficient room for plenty of air circulation around and between units. The holder 200 helps to co-locate the instruments and provides extra protection against accidental knocks.

Figure 3:
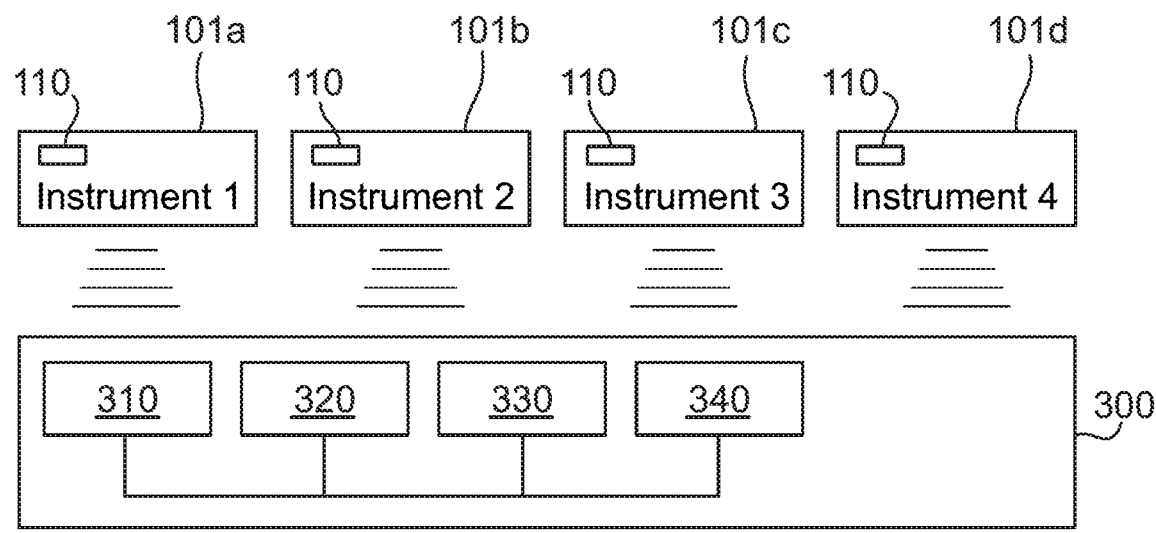
FIG. 3 schematically shows the transmission of data from radon instruments to a personal computer.

FIG. 3 shows four individual instruments 101 transmitting data wirelessly to a personal computer 300 for further analysis. Note that this diagram is schematic in nature. The four instruments 101 could be co-located or they may be located in separate places as illustrated in either FIG. 1a or 1b. Each instrument 101 includes a tilt sensor or accelerometer 110 that detects movement or disruption of the unit and reports this in its data output so as to flag up any potential tampering that has occurred.

Personal computer (PC) 300 includes a processor 310, memory (RAM) 320, a wireless network interface controller 330 and a display 340. These components are all interconnected in known fashion and the PC 300 is arranged to receive data from each of the individual instruments 101 and to process the received data so as to generate outputs such as a radon concentration report for the user. Data transfer from the instruments 101 can be triggered in any suitable way, e.g. via a wireless signal from the PC 300 or the units can request to initiate a transfer periodically, e.g. when their local memory is full or when a preset time period has elapsed. It should be noted that PC 300 could be any kind of computer including a desktop or laptop computer, a smartphone or a tablet, since any of these devices have the necessary means of wireless communication available and the necessary processing power to perform the required calculations.

Once the PC 300 has obtained data from each of the individual instruments 101a, 101b, 101c, 101d, a data merging process is undertaken. The data from each instrument 101a-d is time stamped with a local time generated by the clock on the respective instrument 101a-d. These clocks are not synchronized and therefore the first step in data merging is to adjust the timestamps so that all data refers to a common time frame. This can be done simply by requesting a local time from the instrument 101 as part of the data collection process and noting a difference between the instrument local time and the PC local time (which will be taken as the common reference time in this embodiment). This difference is applied as an offset to all timestamps from the data from that instrument 101a-d. Once this has been done for each instrument, the four data streams all refer to the same time scale and can be merged. Optionally, at the same time (i.e. on data transfer), the local clock of each instrument 101a-d can be updated to match that of the PC's local clock (i.e. the reference clock) so that all instruments 101a-d are synchronized again. This provides a useful way to keep all of the instrument clocks fairly up to date without requiring expensive accurate local clocks on each instrument.

As shown in FIG. 4, the data from each instrument 101a-d is made up of a number of time slots, each of 30 minute duration and each having a timestamp corresponding to the start of the period and a number of detected radon disintegrations that were detected by that instrument 101a-d within that time slot. For example, the data from instrument 101a has timeslots including those starting at 12:00, 12:30 and 13:00 (as well as many others not shown here). The associated number of radon disintegrations in these time slots is 12, 8 and 14 respectively. Similar data streams are also shown for instruments 101b-d. In FIG. 4 the data streams from instruments 101a-d are shown on the common time scale. The time slots for the different instruments do not line up due to the discrepancy between their local clocks at the point of data transfer. Further details of data combining/merging processes will be described with reference to FIGS. 6 and 7.

Figure 5:
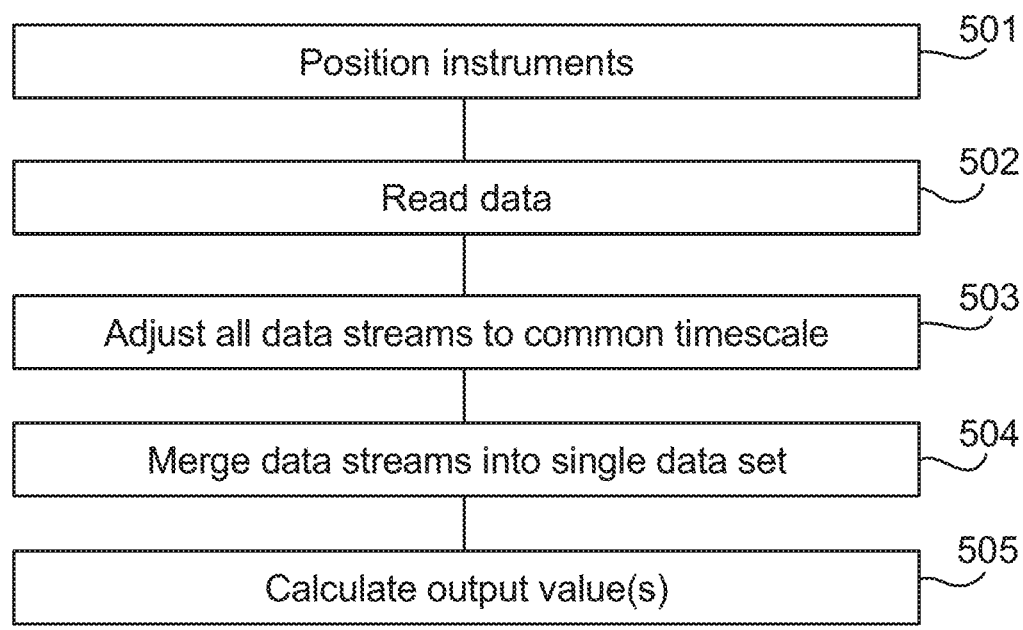
FIG. 5 is a flow diagram for combining individual data sets.

FIG. 5 shows an example process that can be followed for taking measurements. In step 501, the instruments 101a-d are placed in the locations of interest. This may involve placing all instruments in a single location or it may involve placing instruments at different locations of interest. In the latter case, a single instrument or a plurality of instruments may be placed at each location as desired. In step 502 data is read from each individual instrument 101. The data is transferred from each instrument 101 to a central computer which may be either or personal computer or a server. In step 503, after receiving all the data, the computer 300 adjusts each individual data stream so that all data streams reference a common time scale. In step 504 the computer 300 combines the data from the various data streams into a single data set and in step 505 the computer 300 calculates one or more outputs from the single combined data set, such as a radon concentration value or an exposure value.

Since each individual instrument 101 is capable of uploading to a PC, the temporal history of the radon concentration at that instrument 101 can be plotted for the user with the possibility of indicating measurement uncertainty at each measurement point.

Since a radon concentration value for a certain time interval is calculated based on the counted number of alpha particles detected in that time interval, the measurement uncertainty is governed by counting statistics (also known as Poisson statistics). In counting statistics we can generally say that the measurement uncertainty is proportional to the square root of the number of counts. This means that if you have counted N particles in a time interval, the uncertainty is $\sqrt{N}$, so the value with uncertainty may be given as $N\pm\sqrt{N}$. This means of course that the relative uncertainty is proportional to one over the square root on N (since $\sqrt{N}/N=1/\sqrt{N}$).

This also means that if you put multiple instruments 101 in the same location, you can combine the count values from all instruments to create a 'combined instrument' with a uncertainty. For example, with M individual instruments 101, the uncertainty is reduced by $1/\sqrt{M}$. So for M=4 instruments, the combined instrument would have an uncertainty of only ½ that of each individual instrument.

This merging of data is illustrated in FIG. 6 which shows the data streams from the four instruments 101a-d shown in FIG. 4. Below the four data streams, three time domain bins 601, 602, 603 are shown, each with a duration of 30 minutes, i.e. the same as the time slots of each of the individual instruments 101a-d. To allocate the counts of the individual instruments into the correct time domain bin, 601, 602, 603, the time slots of the individual instruments 101a-d are divided between the bins 601, 602, 603 that they overlap with in time. The division is simply done on a pro rata basis on the assumption that the counts within a time slot were randomly distributed across the time slot.

For example taking the data stream from instrument 101a, the timeslots all align with the reference time scale for the time domain bins 601, 602, 603 so no adjustment is required. The values from each time slot of instrument 101a are simply transferred directly into the corresponding time domain bin 601, 602, 603. The time slots of instrument 101b begin at 11:50, 12:20, 12:50, 13:20, etc. There is thus a 10 minute offset with respect to the time domain bins 601, 602, 603. The first time domain bin 601 overlaps with both the time slots that began at 11:50 (67% overlap) and the one that began at 12:20 (33% overlap). Accordingly, 67% of the count from the 11:50 time slot and 33% of the count from the 12:20 time slot of instrument 101b are added to first time domain bin 601. Similarly the data stream from instrument 101c shows that time domain bin 601 overlaps 50% with each of the 11:45 time slot and the 12:15 time slot. Therefore 50% of the count from the 11:45 time slot and 50% of the count from the 12:15 time slot are added to the first time domain bin 601. Finally, the data stream from instrument 101d shows that the time domain bin 601 overlaps 83% with the time slot that began at 11:55 and 17% with the time slot that began at 12:25. Therefore 83% of the count from the 11:55 time slot and 17% of the count from the 12:25 time slot are added to the first time domain bin 601. The same procedure applies to the other time domain bins 602, 603 as shown in the figure. In this way, the data from the various time slots from the various instruments 101a-d are divided between the first, second and third time domain bins 601, 602, 603 (and others not shown in the figure).

Each time domain bin 601, 602, 603 now contains an increased number of counts compared with any one individual instrument 101a-d. In fact, assuming that the individual instruments 101a-d are the same make and model then on average each bin 601, 602, 603 should contain M times as many counts as an individual instrument (M being the number of instruments). Therefore the uncertainty associated with each bin 601, 602, 603 of the "virtual instrument" formed by combining the individual instruments is reduced by a factor of $\sqrt{M}$ as discussed above. For four instruments 101a-d as shown in FIG. 6, the uncertainty is expected to be approximately half that of the individual instruments. Indeed, as can be seen from FIG. 6, the individual measurements range from 7 to 15 with corresponding relative uncertainties ranging from ±38% to ±26%. Meanwhile the relative uncertainties for the time domain bins 601, 602 and 603 range from ±15% to ±16%, i.e. about half of the individual measurements as expected.

Note that when calculating a radon concentration value from the number of counts in each bin 601, 602, 603, account must be taken of the fact that these counts have been collected from a larger volume of air (the combined volume of the four instruments 101a-d).

FIG. 7 shows an alternative way of placing multiple instruments and combining their data. FIG. 7 shows the data streams from three instruments throughout a 24 hour period (the three data streams have been converted onto a common time scale in the same way as described above). One instrument 101a was placed for example in the user's bedroom at home, a second instrument 101b was placed in the user's office at their place of work and a third instrument 101c was placed in the user's living room at home. It is known that this particular user gets up at 7 am, leaves the house at 8.30 am, is in work from 9 am until 5 pm, arrives home at 5.30 pm and spends most of the evening from 7 pm at home in the living room until going to bed at 11 pm. This scheduling information can be combined in the computer 300 with the data streams from the various instruments 101a-c to produce an estimate of the user's exposure to radon across the three locations that are being monitored. Thus, the data streams are combined as follows:

| Time period | Instrument |
| --- | --- |
| 00:00 to 07:00 | First instrument 101a (bedroom) |
| 07:00 to 09:00 | No data (perhaps kitchen and commuting) |
| 09:00 to 17:00 | Second instrument 101b (work) |
| 17:00 to 19:00 | No data (commuting and kitchen again) |
| 19:00 to 23:00 | Third instrument 101c (living room) |
| 23:00 to 00:00 | First instrument 101a (bedroom) |

The periods of no data can either be left blank or can be filled with a representative (or typical) average count such as 100 $Bq/m^3$.

If more than one instrument is provided in each location, then the data from those individual instruments are merged into a virtual instrument for that location and then a suitable time period of the virtual instrument is used in the overall analysis for the user.

The use of smaller individual instruments provides more flexibility. A set of several such instruments can be used either for improved uncertainty in one location (as per FIG. 6) or for monitoring several locations (as per FIG. 7) as the user wishes. Each individual instrument can also be used as a standalone unit to monitor a location. The fact that each instrument acts as a standalone unit is of great benefit. An individual unit is attractive to a single user wishing to monitor radon levels in a single location (e.g. at home) over a long period of time (e.g. several weeks, months or years). For such extended measurements, the number of counts during relevant time periods can be built up over time (e.g. by combining several days of data) and therefore a sufficiently low uncertainty can be obtained with a single instrument. As these instruments are small and can be manufactured and sold in high quantities, the unit cost can be decreased compared to other radon monitors. Typically, the smaller individual units may sell in quantities 50-100 times greater than higher sensitivity instruments. Then when several individual units are combined to be used e.g. for obtaining lower uncertainty the cost of the several individual units can be lower than the cost of a single higher accuracy radon monitor. For example, the cost of a single individual instrument can be less than a fifth of the cost of a typical higher accuracy radon monitor. Therefore a set of four or five individual instruments can still be less expensive while capable of providing measurements with an uncertainty half (or less) than one of the individual instruments on its own. Additionally, a user may switch between different uses of the multiple instruments. For example, single instruments may be placed in several different locations initially to get an initial indication of approximate radon levels.

Then in a subsequent phase, any areas where the radon concentration is particularly high or of particular concern may be supplemented with additional instruments so as to obtain measurements with lower uncertainty faster. Note that in this scenario, the initial instrument need not be moved or reset, but others may simply be added by placing them adjacent to the first.

As an example of the above, four individual radon monitors may be placed it different locations around a public building for a period of a week. After a week the data from each instrument is read and one monitor is found to indicate a radon concentration higher than the acceptable threshold while the other three are found to be lower. These latter three instruments may then be moved adjacent to the one with the high read out and left for a further 3 days. The data from all instruments is then read again and then merged as described in relation to FIG. 6 so as to produce a reading with decreased uncertainty on the basis of which better recommendations can be given with regard to the radon level and possible actions required to reduce this. More generally, additional individual units can be brought in to supplement an existing unit on a temporary basis and removed again when no longer required, leaving the original unit undisturbed throughout.

The invention claimed is:

1. A method of measuring a radon concentration or a radon exposure level comprising:
   placing a plurality of radon measurement instruments at locations, each radon measurement instrument being capable of outputting radon measurement data;
   receiving radon measurement data from each of said plurality of radon measurement instruments;
   combining said radon measurement data from said plurality of radon measurement instruments into a single data set; and
   calculating a radon concentration or radon exposure value from said single data set;
   wherein an instrument, which is one of the plurality of radon measurement instruments, comprises one or more accelerometers or motion sensors to detect movement of the instrument and wherein if movement is detected, data from the instrument is excluded from said single data set.

2. A method as claimed in claim 1, comprising placing the plurality of radon measurement instruments in a same area such that the plurality of radon measurement instruments sample a same environment.

3. A method as claimed in claim 1, comprising placing the plurality of radon measurement instruments within 1 metre of each other.

4. A method as claimed in claim 1, wherein the plurality of radon measurement instruments all have a same radon sensitivity.

5. A method as claimed in claim 1, wherein the plurality of radon measurement instruments are placed in a plurality of environments and wherein the radon measurement data from said plurality of radon measurement instruments are combined by extracting data in different time segments from each radon measurement instrument and inserting them into the single data set.

6. A method as claimed in claim 1, wherein the single data set is divided into time slots and wherein the method comprises calculating for a time slot, which is one of the time slots, a radon concentration or radon exposure value and a measurement uncertainty value based on a number of alpha particles detected within the time slot.

7. A method as claimed in claim 1, wherein the radon measurement data from each radon measurement instrument has a number of energy windows with a count associated with each energy window.

8. A method as claimed in claim 1, wherein the radon measurement instruments are battery powered.

9. A method as claimed in claim 1, wherein combining data from the plurality of radon measurement instruments comprises comparing a clock on each radon measurement instrument to a reference clock and determining a clock offset for each radon measurement instrument, and adjusting timestamp data in the data from each radon measurement instrument using said clock offset so that the timestamp data relates to a common time scale.

10. A method as claimed in claim 1, wherein each radon measurement instrument's data is divided into time slots and wherein combining each radon measurement instrument data into said single data set comprises interpolating the time slots of each individual radon measurement instrument data into time slots of a common time frame of said single data set.

11. A radon monitor comprising:
    a plurality of radon measurement instruments, each radon measurement instrument being capable of outputting radon measurement data; and
    a data processor arranged to receive radon measurement data from each radon measurement instrument, combine said radon measurement data from said plurality of radon measurement instruments into a single data set and calculate a radon concentration or radon exposure value from said single data set;
    wherein an instrument, which is one of the plurality of radon measurement instruments, comprises one or more accelerometers or motion sensors to detect movement of the instrument and wherein the data processor is arranged such that if movement is detected, data from the instrument is excluded from said single data set.

12. A radon monitor as claimed in claim 11, wherein the plurality of radon measurement instruments are located in a same area such that of lithe plurality of radon measurement instruments sample a same environment.

13. A radon monitor as claimed in claim 12, wherein the plurality of radon measurement instruments are located within 1 metre of each other.

14. A radon monitor as claimed in claim 11, wherein the plurality of radon measurement instruments have a same radon sensitivity.

15. A radon monitor as claimed in claim 11, wherein the radon measurement plurality of instruments are located in a plurality of environments and wherein the data processor is arranged to combine the radon measurement data from said plurality of radon measurement instruments by extracting data in different time segments from each radon measurement instrument and inserting them into the single data set.

16. A radon monitor as claimed in claim 11, wherein the single data set is divided into time slots and wherein the data processor is arranged to calculate for a time slot, which is one of the time slots, a radon concentration or radon exposure value and a measurement uncertainty value based on a number of alpha particles detected within the time slot.

17. A radon monitor as claimed in claim 11, wherein the radon measurement data from each radon measurement instrument has a number of energy windows with a count associated with each energy window.

18. A radon monitor as claimed in claim 11, wherein the plurality of radon measurement instruments are battery powered.

19. A radon monitor as claimed in claim 11, wherein when combining data from the plurality of radon measurement instruments said data processor is arranged to compare a clock on each radon measurement instrument to a reference clock and determine a clock offset for each radon measurement instrument, and wherein said data processor is further arranged to adjust timestamp data in the data from each radon measurement instrument using said clock offset so that timestamp data relates to a common time scale.

20. A radon monitor as claimed in claim 11, wherein each radon measurement instrument is arranged to produce data divided into time slots and wherein when combining each radon measurement instrument data into said single data set said data processor is arranged to interpolate the time slots of each radon measurement instrument data into time slots of a common time frame of said single data set.

* * * * *

UNITED STATES PATENT AND TRADEMARK OFFICE
CERTIFICATE OF CORRECTION

| | |
|---|---|
| PATENT NO. | : 10,921,465 B2 |
| APPLICATION NO. | : 15/325410 |
| DATED | : February 16, 2021 |
| INVENTOR(S) | : Yoshioka et al. |

It is certified that error appears in the above-identified patent and that said Letters Patent is hereby corrected as shown below:

In the Claims

Column 15,
Line 3, "that of lithe plurality" should be --that the plurality--

Signed and Sealed this
Seventh Day of March, 2023

Katherine Kelly Vidal
Director of the United States Patent and Trademark Office